(12) United States Patent
Feldtkeller

(10) Patent No.: US 6,643,144 B2
(45) Date of Patent: Nov. 4, 2003

(54) CIRCUIT CONFIGURATION FOR APPLYING A SUPPLY VOLTAGE TO A LOAD AND METHOD FOR SUCH APPLICATION

(75) Inventor: Martin Feldtkeller, München (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/195,709

(22) Filed: Jul. 15, 2002

(65) Prior Publication Data

US 2003/0001548 A1 Jan. 2, 2003

Related U.S. Application Data

(63) Continuation of application No. PCT/EP01/00170, filed on Jan. 9, 2001.

(30) Foreign Application Priority Data

Jan. 14, 2000 (DE) .......................... 100 01 394

(51) Int. Cl.$^7$ .............................. H02M 3/335
(52) U.S. Cl. .................. 363/16; 363/19; 363/131; 323/225
(58) Field of Search ............... 363/16, 18, 19, 363/20–21.18, 131; 323/282, 284, 225, 222

(56) References Cited

U.S. PATENT DOCUMENTS

| | | |
|---|---|---|
| 4,414,479 A | 11/1983 | Foley |
| 4,559,592 A | 12/1985 | Muller |
| 5,014,178 A | 5/1991 | Balakrishnan |
| 5,285,369 A | 2/1994 | Balakrishnan |
| 5,559,683 A | 9/1996 | Schoenwald |
| 5,621,623 A | 4/1997 | Kuriyama et al. |
| 5,768,118 A | * 6/1998 | Faulk et al. ............ 363/131 X |
| 6,002,598 A | 12/1999 | Seinen et al. |

FOREIGN PATENT DOCUMENTS

| | | |
|---|---|---|
| DE | 37 21 075 C1 | 1/1989 |
| EP | 0 585 788 A1 | 3/1994 |
| EP | 0 585 789 A1 | 3/1994 |
| JP | 2000 014 148 A | 1/2000 |

\* cited by examiner

*Primary Examiner*—Jessica Han
(74) *Attorney, Agent, or Firm*—Laurence A. Greenberg; Werner H. Stemer; Ralph E. Locher

(57) ABSTRACT

A circuit configuration for pulsed application of a first supply voltage to a load includes a first switch, connected in series with the load, a first control connector, a control circuit for control of the first switch and having a first output terminal connected to the control connector of the first switch and first and second voltage supply terminals, a second switch connected between the load and the first voltage supply terminal of the control circuit and having a second control connector to which a control signal is supplied. The invention also includes a method for actuating the first and second switches and use of the inventive circuit configuration in a switched-mode power supply or a power factor controller.

25 Claims, 6 Drawing Sheets

CIRCUIT CONFIGURATION FOR APPLYING A SUPPLY VOLTAGE TO A LOAD AND METHOD FOR SUCH APPLICATION

CROSS-REFERENCE TO RELATED APPLICATION

This application is a continuation of copending International Application No. PCT/EP01/00170, filed Jan. 9, 2001, which designated the United States and was not published in English.

BACKGROUND OF THE INVENTION

Field of the Invention

The present invention relates to a circuit configuration for applying a clocked application of a supply voltage to a load.

Such circuit configurations are used, by way of example, in switched-mode power supplies or power factor controllers, in which an inductor is respectively connected to a supply voltage in clocked fashion based upon actuation signals. In such a case, the actuation signals for the first switch, which is connected in series with the load, are produced by the control circuit, whose correct operation requires a supply voltage applied to its voltage supply terminals.

A prior art circuit configuration of such a type is disclosed in European Patent Application 0 585 788 A1, corresponding to U.S. Pat. No. 5,285,369 to Balakrishnan, particularly, in FIG. 3 thereof. In such a case, the circuit configuration is part of a switched-mode power supply, where a series circuit including the primary coil of a transformer and a first switch, in the form of a MOSFET, is connected between output terminals of a bridge rectifier. To actuate the MOSFET, a control circuit is provided. To supply the control circuit with voltage, a depletion-mode MOSFET or a JFET (Junction FET) is connected between the primary coil and the MOSFET, with one supply terminal of the control circuit being connected to a node that is common to the JFET and to the MOSFET in order to output a supply voltage for the control circuit when the MOSFET is off. Furthermore, in addition to the secondary winding of the transformer, the secondary side is provided with an auxiliary winding having a downstream rectifier, the auxiliary winding likewise being used to supply voltage to the control circuit.

When the MOSFET acting as a switch in this apparatus is on, the JFET connected in series with it is also on. When the MOSFET turns off, the JFET also starts to turn off, which results in approximately all of the supply voltage appearing across the JFET. In a transition phase, a current then still flows through the JFET into the control circuit, but this is associated with a high power loss on the JFET.

A secondary-side auxiliary winding having a rectifier, use of which for supplying voltage to a control circuit even without the JFET from the cited print is already in the prior art, requires the use of discrete components whose cost has an adverse effect on the total price of the power supply unit or power factor controller. This is particularly true for switched-mode power supplies in power classes between 5 W and 20 W, which are used to safeguard the "standby mode" in electronic appliances and that are subject to an especial cost pressure.

SUMMARY OF THE INVENTION

It is accordingly an object of the invention to provide a circuit configuration for applying a supply voltage to a load that overcomes the hereinafore-mentioned disadvantages of the heretofore-known devices and methods of this general type and that dispenses with an auxiliary winding and with the use of discrete components for the voltage supply to the control circuit and in which there is no or only very little power loss when providing the supply voltage for the control circuit.

With the foregoing and other objects in view, there is provided, in accordance with the invention, a circuit configuration for clocked application of a supply voltage to a load, the circuit configuration including a first switch having a first control connection, the first switch connected in series with the load, a control circuit connected to the first switch, the control circuit having a first output terminal connected to the first control connection for actuating the first switch and first and second voltage supply terminals, and a second switch having a second control connection to which an actuation signal is supplied, the second switch connected between the load and the first voltage supply terminal.

Accordingly, in addition to the first switch connected in series with the load, the circuit configuration has a second switch that is connected between the load and the first voltage supply terminal of the control circuit. In such a case, when the first switch has turned off, the second switch, which is on and is preferably likewise actuated by the control circuit, takes on the current flowing through the load and supplies it to the control circuit through the first voltage supply terminal thereof. The current flowing through the second switch is preferably buffered in a capacitor connected in parallel with the voltage supply terminals of the control circuit to provide a continuous, only slowly decreasing supply voltage for the control circuit after the second switch has turned off until it next turns on.

In the on state, the voltage drop across the second switch is only small in relation to the total voltage on account of the low conduction resistance, which means that the power loss on the second switch is low. A large part of the voltage drops across the load, with inductive loads involving storage of energy that is subsequently used in a switched-mode power supply or power factor controller.

The second switch can be implemented, almost without additional cost requirement, as an integrated component in the integrated circuit for the control circuit or in the integrated circuit for the first switch—with the control circuit and the first switch also being able to be accommodated in an integrated circuit.

In accordance with another feature of the invention, the control circuit has a second output terminal connected to the second control connection for actuating the second switch.

In accordance with a further feature of the invention, there is provided a capacitor is connected between the first and second voltage supply terminals and in parallel with the control circuit.

In accordance with an added feature of the invention, there is provided a series circuit including the second switch and the control circuit is connected in parallel with the first switch. So long as the first switch in such an embodiment is on, the voltage appearing across the series circuit including the second switch and the control circuit is not sufficient to cause a flow of current, when the second switch is on, into the control circuit and to the capacitor connected in parallel with the control circuit. When the first switch is turned off, the voltage appearing across its load path rises until a voltage has been reached that allows a current to flow to the capacitor through the second switch, which is on. The second switch is preferably likewise actuated using the control circuit, with a second output terminal of the control circuit being connected to a control connection of the second switch.

The second switch can be actuated in various ways. Thus, the second switch can already be on when the first switch is on. Alternatively, the second switch can be turned on only shortly before or at the same time as the first switch turns off in order to supply current to the control circuit for a period of time. The period for which the second switch remains on after the first switch has turned off is dependent, in the control circuit, on the voltage present across the voltage supply terminals or across the capacitor. Preferably, the second switch remains on until the capacitor has been "filled" again with the charge drawn since the last charging operation or until the voltage across the capacitor reaches a prescribable nominal value.

In accordance with an additional feature of the invention, there is provided a diode connected between the first voltage supply terminal and the second switch.

In accordance with yet another feature of the invention, the first switch and the second switch have a common node and a diode is connected between the common node and the first voltage supply terminal of the control circuit.

In accordance with yet a further feature of the invention, there is provided a diode connected between the first voltage supply terminal and the second control connection.

In accordance with yet an added feature of the invention, the second switch is connected in series with the first switch and preferably between the load and the first switch. In such an embodiment, the first voltage supply terminal of the control circuit is connected to the node that is common to the first and to the second switch, preferably, through a diode. When the first and second switches are on, a current flows through the load and through the two switches connected in series therewith. Virtually all of the supply voltage present across the series circuit drops across the load. The voltage dropping across the first switch is not sufficient to cause a flow of current in the control circuit connected in parallel therewith and to the capacitor connected in parallel with the control circuit. If the first switch is turned on and the second switch remains on, the voltage appearing across the first switch rises until, with the second switch on, a current can flow through the load and the second switch to the capacitor to charge it again. The second switch is proportioned such that it has a low conduction resistance in the on state, which means that the power loss across it is low.

In accordance with yet an additional feature of the invention, the supply voltage is supplied at a terminal and a resistor is connected between the terminal and the first voltage supply terminal.

In accordance with again another feature of the invention, there is provided a resistor connected in parallel with the second switch between the load and the first voltage supply terminal.

In accordance with again a further feature of the invention, the first switch has a connection terminal remote from the load and the second voltage supply terminal and the connection terminal are connected to a common terminal at reference ground potential.

The first and second switches are preferably in the form of semiconductor switches, particularly in the form of MOSFETs, with the second semiconductor switch being able to be in the form of a depletion-mode FET or JFET.

In accordance with again an added feature of the invention, the first and second switches are semiconductor switches selected from the group consisting of FETs and IGBTs. The second switch can be a depletion-mode MOSFET or a JFET. The first switch can be an IGBT and the second switch can be a MOSFET.

The invention also covers a method for actuating the first and second switches.

With the objects of the invention in view, there is also provided a switched-mode power supply for applying a supply voltage to a load, the power supply including a first switch having a first control connection, the first switch connected in series with the load, a control circuit connected to the first switch, the control circuit having a first output terminal connected to the first control connection for actuating the first switch and first and second voltage supply terminals, a second switch having a second control connection to which an actuation signal is supplied, the second switch connected between the load and the first voltage supply terminal.

With the objects of the invention in view, there is also provided a method for applying a supply voltage to a load, including the steps of connecting a first switch in series with the load, the first switch having a first control connection, connecting a control circuit to the first switch, the control circuit having a first output terminal and first and second voltage supply terminals, connecting the first output terminal to the first control connection for actuating the first switch, connecting a second switch between the load and the first voltage supply terminal, the second switch having a second control connection, supplying an actuation signal to the second control connection, actuating the first and second switches by turning on the first and second switches at least approximately at the same time and turning off the first and second switches at different times.

In accordance with again an additional mode of the invention, an on duration of the second switch is dependent upon a value of the supply voltage present across the first and second voltage supply terminals.

With the objects of the invention in view, there is also provided a method for applying a supply voltage to a load, including the steps of connecting a first switch in series with the load, the first switch having a first control connection, connecting a control circuit to the first switch, the control circuit having a first output terminal and first and second voltage supply terminals, connecting the first output terminal to the first control connection for actuating the first switch, connecting a second switch between the load and the first voltage supply terminal, the second switch having a second control connection, supplying an actuation signal to the second control connection, actuating the first and second switches by turning on the second switch one of before and at approximately the same time as the first switch is turned off and turning off the second switch after the first switch has been turned off.

The invention also provides for the use of the inventive circuit configuration in a switched-mode power supply or a power factor controller.

With the objects of the invention in view, in a switched-mode power supply applying a supply voltage to a primary coil of a transformer, there is also provided a circuit configuration including a first switch having a first control connection, the first switch connected in series with the primary coil, a control circuit connected to the first switch, the control circuit having a first output terminal connected to the first control connection for actuating the first switch and first and second voltage supply terminals, and a second switch having a second control connection to which an actuation signal is supplied, the second switch connected between the primary coil and the first voltage supply terminal.

With the objects of the invention in view, in a power factor controller applying a supply voltage to an inductor through which an input current flows, there is also provided a circuit configuration including a first switch having a first control connection, the first switch connected in series with the inductor, a control circuit connected to the first switch, the control circuit having a first output terminal connected to the first control connection for actuating the first switch and first and second voltage supply terminals, and a second switch having a second control connection to which an actuation signal is supplied, the second switch connected between the inductor and the first voltage supply terminal.

Other features that are considered as characteristic for the invention are set forth in the appended claims.

Although the invention is illustrated and described herein as embodied in a circuit configuration for applying a supply voltage to a load, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

In the figures of the drawings, unless stated otherwise, identical reference symbols denote identical parts.

Figure 1:
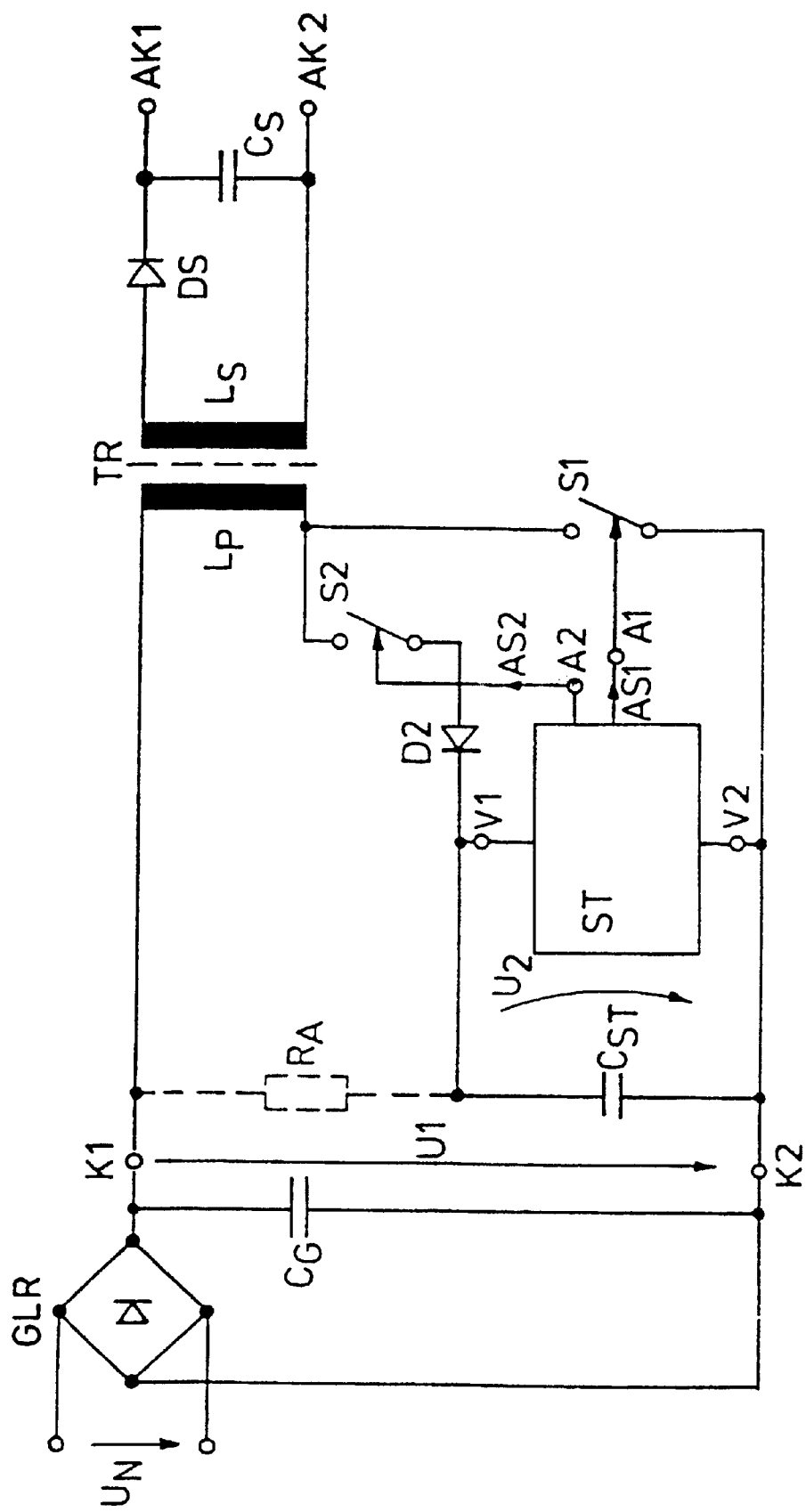
FIG. 1 is a block and schematic circuit diagram of a first circuit configuration according to the invention.

Referring now to the figures of the drawings in detail and first, particularly to FIG. 1 thereof, there is shown a first exemplary embodiment of a circuit configuration in accordance with the invention for the clocked application of a first supply voltage U1 to a load TR. FIG. 1 shows the inventive circuit configuration being used in a switched-mode power supply in which the first supply voltage U1 is available between the first and second supply terminals K1, K2, with the first supply voltage U1 being produced from a power supply voltage $U_N$ by rectification using a bridge rectifier GLR and a capacitor $C_G$. In the case of the switched-mode power supply, the load to be connected to the supply voltage U1 forms a primary coil $L_P$ of a transformer TR to which it is possible to connect, on the secondary side, a load for supplying a DC voltage on connection terminals AK1, AK2. In such a case, a secondary-side rectifier configuration $D_S$, $C_S$ is used to rectify a voltage induced in a secondary coil $L_S$ by the primary coil $L_P$.

The inventive circuit configuration has a first switch S1 connected in series with the primary coil $L_P$, with a first connection terminal of the first switch S1 being connected to the primary coil $L_P$. The series circuit including the primary coil $L_P$ and the first switch S1 is connected between the first and second supply terminals K1, K2. The first switch has a control connection connected to a first output terminal A1 of a control circuit ST that provides a first actuation signal AS1, based upon which the first switch S1 is turned off and on.

The control circuit ST has a first and a second voltage supply terminal V1, V2 for applying a second supply voltage U2, which is required for the control circuit ST to operate correctly. Connected in parallel with the voltage supply terminals V1, V2 in the exemplary embodiment is a storage capacitor $C_{ST}$, which can also be provided internally in the control circuit. To supply voltage to the control circuit ST, the invention provides a second switch S2, which is connected between the primary coil $L_P$ and the first voltage supply terminal V1. The second switch S2 in the exemplary embodiment shown in FIG. 1 is connected between a node that is common to the primary coil $L_P$ and to the first switch S1 and the first voltage supply terminal V1, or the storage capacitor $C_{ST}$. The second switch S2 has a control connection for supplying a second actuation signal AS2, the control connection being connected to a second output terminal A2 of the control circuit ST in the exemplary embodiment.

The function of the second switch S2 is to charge the capacitor $C_{ST}$, which provides the voltage or current required for operating the control circuit ST, through the primary coil $L_P$ at intervals of time. Preferably, a resistor $R_A$—shown in dashes in FIG. 1—is connected between the first terminal K1 and the capacitor $C_{ST}$ to charge the capacitor $C_{ST}$ to begin with, i.e., when the power supply unit is turned on, and, thus, to provide energy for first producing the actuation signals AS1, AS2.

When the first switch S1 is on, approximately all of the first supply voltage U1 is present across the load $L_P$. In such a case, the current rises—after an initial current pulse—constantly, as shown by the time profile for the current I1 through the first switch after turning on at the time t=t0 in FIG. 6. The voltage appearing across the first switch S1 in such a case is too low to cause a flow of current through the second switch S2 to the capacitor $C_{ST}$. Normally, the second supply voltage U2 present across the capacitor $C_{ST}$ on account of the stored charge is already higher than the voltage present across the first switch S1, which is on. A diode D2 between the capacitor $C_{ST}$ and the second switch S2 prevents the charge stored in the capacitor $C_{ST}$ from flowing away through the switches when the first and second switches S1, S2 are on.

Figure 6:
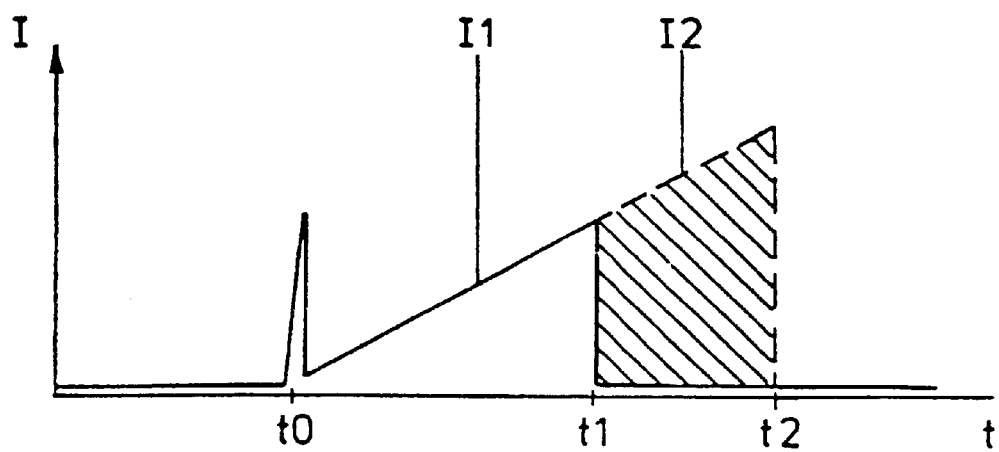
FIG. 6 is a time profile indicating current through the first and second switches according to the invention.

If the first switch S1 is turned off at the time t=t1 and if the second switch S2 is on at the same time, then the second switch S2 takes on the current flowing through the primary coil $L_P$ and, thus, charges the capacitor until it is turned off under the actuation of the control circuit ST at a time t=t3. FIG. 6 shows, in dashes, the profile for the current through the second switch S2 when the first switch S1 has turned off. It can be seen that the current through the primary coil continues to rise steadily until the second switch turns on. The area content of the shaded area corresponding to the charge is taken up by the capacitor. To be precise, the current through the primary coil $L_P$ when charging the capacitor $C_{ST}$ rises somewhat less sharply than previously because charging the capacitor $C_{ST}$ entails a slight voltage loss on the primary coil $L_P$. Normally, the second supply voltage U2 is no higher than 10–15 V as compared with a first supply voltage U1 of higher than 200 V, which means that the voltage loss is barely significant.

In the on state, the second switch S2 preferably has a low conduction resistance, which means that virtually no power loss occurs on the second switch S2 when charging the capacitor $C_{ST}$.

While the capacitor $C_{ST}$ is being charged with the first switch S1 off and the second switch S2 on, energy continues to be stored in the primary coil $L_P$ and, when the first and second switches S1, S2 are off, is delivered to a load that can be connected on the secondary side. The inventive circuit configuration, thus, causes voltage to be supplied to the control circuit ST, which is simple to implement and operates with very low losses.

Actuation of the first switch S1 works in the conventional manner for switched-mode power supplies based on the prior art. The second switch S2 can be actuated in a variety of ways. A governing factor in such a context is that the second switch S2 is on when the first switch S1 is turned off. The period for which the second switch S2 is on preferably depends on the second supply voltage U2 present across the control circuit ST, which decreases slowly on account of the delivery of current to the control circuit ST between the periods of time in which charge subsequently flows through the second switch S2. The second switch S2 preferably remains on until the second supply voltage U2 reaches a prescribable nominal value or until a charge has flowed to the capacitor $C_{ST}$ that corresponds to the charge that has flowed away through the second switch S2 since the last flow of charge, in order subsequently to be turned off under the actuation of the control circuit ST. A circuit configuration for producing an actuation signal AS2 for the second switch is implemented in the control circuit ST based upon whether the second supply voltage U2 exceeds or falls short of a nominal value. Configurations that satisfy such functionality are likewise in the prior art and are not explained in more detail here.

Figure 2:
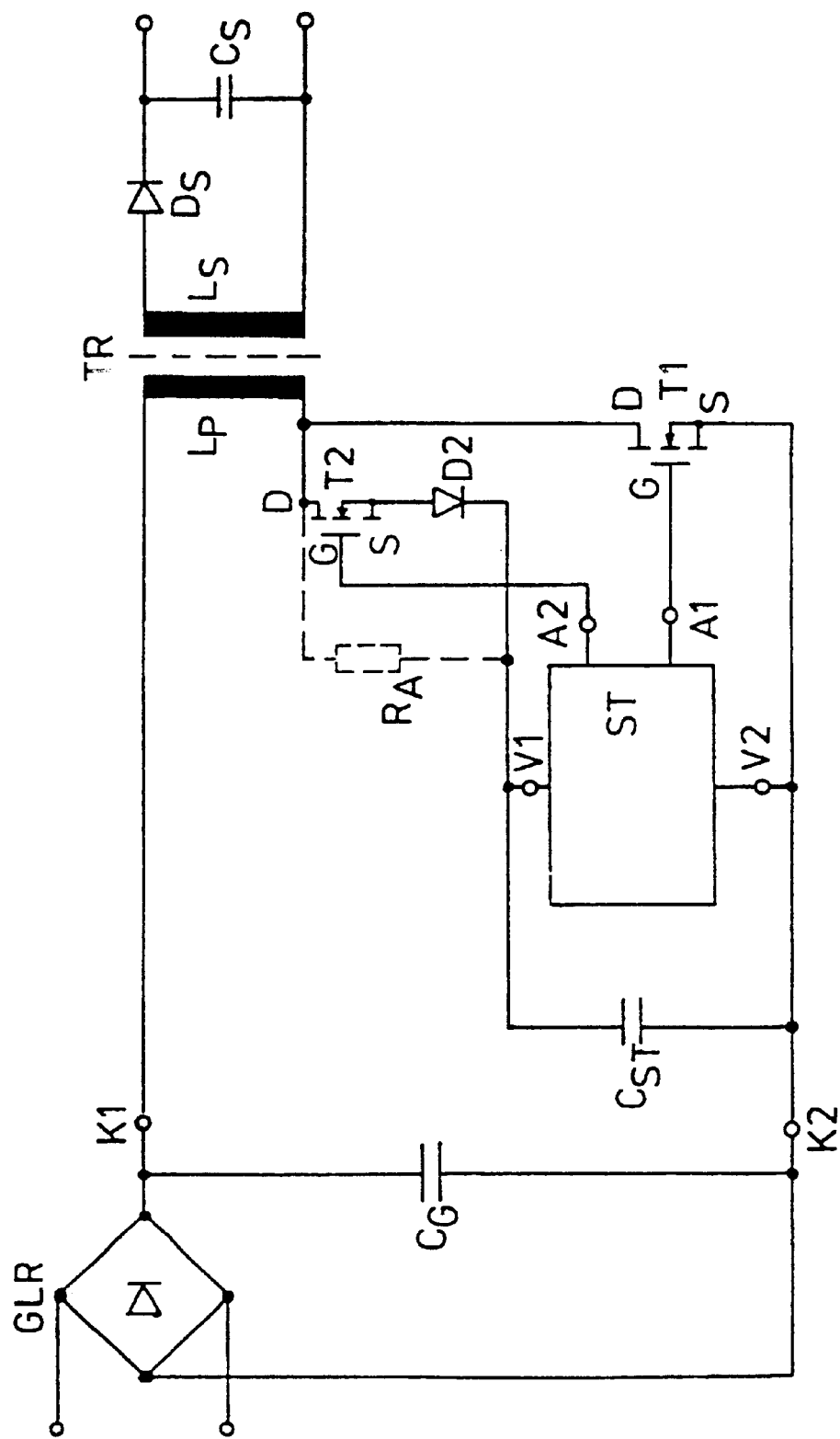
FIG. 2 is a block and schematic circuit diagram of an alternative embodiment of the circuit configuration of FIG. 1 using transistors as first and second switches.

FIG. 2 shows a circuit configuration that is described fundamentally in FIG. 1 and in which the first and second switches S1, S2 are in the form of transistors T1, T2, particularly, in the form of MOSFETS. In such a case, the gate connection G of the first transistor T1 is connected to the first output terminal A1 of the control circuit ST, and the gate connection G of the second transistor T2 is connected to the second output terminal A2 of the control circuit ST. In such an embodiment, a startup resistor $R_A$ is preferably connected between the load $L_P$ and the capacitor $C_{ST}$ to charge the capacitor $C_{ST}$ to begin with. In such a case, the resistor $R_A$ is chosen to be of a size such that, with the first transistor T1 on, the capacitor $C_{ST}$ is discharged only slightly through the first transistor T1.

The diode D2 prevents the capacitor $C_{ST}$ from being discharged through the second transistor T2. On account of the technology, most MOSFETs have an integrated freewheeling diode that causes the MOSFET to be off only in the drain-source direction D-S when no control voltage is applied, while the MOSFET is on when a forward voltage is applied between the source and drain electrodes. The external second diode D2 prevents a flow of current in this direction.

If the second transistor is in the form of an enhancement-mode transistor, then, when using an n-channel transistor, the gate electrode G requires a potential that is higher than the potential on the source electrode S, and, hence, on the first voltage supply terminal V1. The control circuit ST preferably has a charge pump circuit or a "bootstrap" circuit, as are in the prior art, to produce from the second supply voltage U2 a higher voltage for actuating the second switch S2.

In accordance with another embodiment, the second transistor is in the form of a depletion-mode FET or in the form of a JFET. Such transistors are on even when there are low negative voltages between the gate and source electrodes G, S, and do not turn off until the negative voltage exceeds a magnitude that is dependent on the construction. In such a case, the way in which the second transistor T2 is preferably actuated is that its gate electrode G is connected in the control circuit ST to the first voltage supply terminal V1, and, hence, to the second supply voltage U2, through the second output terminal A2 to turn on the transistor. To turn it off, the second transistor T2 is preferably connected to the second terminal K2, and, hence, to reference ground potential, through the second voltage supply terminal V2.

Figure 3:
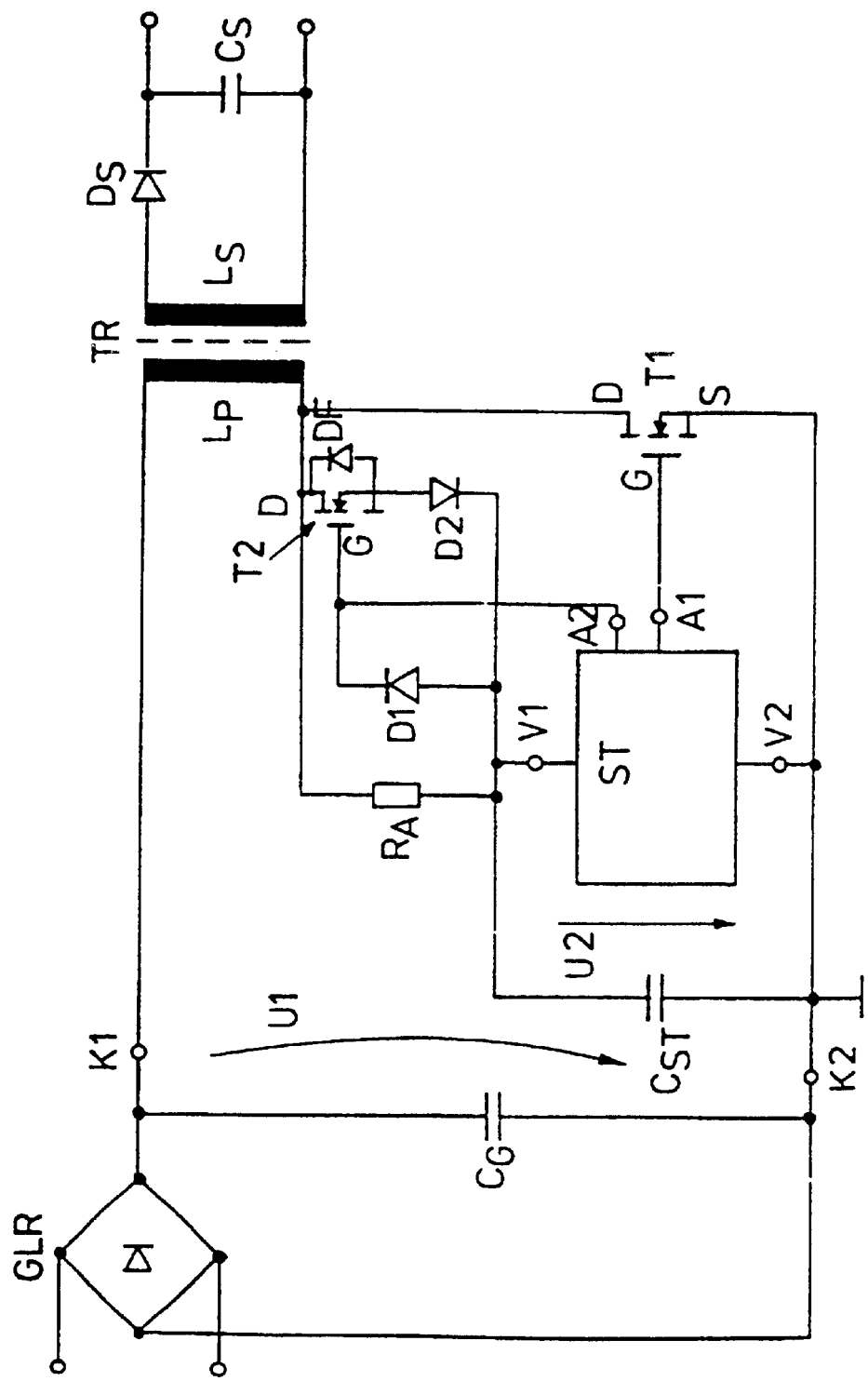
FIG. 3 is a block and schematic circuit diagram of a second alternative embodiment of the circuit configuration of FIG. 1, with different actuation of the second switch as compared with the embodiment of FIG. 2.

FIG. 3 shows another embodiment of the inventive circuit configuration, which allows the use of enhancement mode transistors as first and second transistors T1, T2. In such a case, a further, forward-biased diode D1 is connected between the first voltage supply terminal V1, or one terminal of the capacitor $C_{ST}$, and the gate electrode G of the second transistor T2.

When the first transistor T1 is on under the actuation of the control circuit ST, the drain electrodes D of the first and second transistors T1, T2 are at a low potential that corresponds approximately to the reference ground potential on the second terminal K2. On account of its freewheeling diode DF, which is shown in FIG. 3 for the purposes of illustration, the source electrode S of the second transistor T2 is at a potential that is above the potential on the drain electrode D, or the reference ground potential, by the forward voltage for the diode DF, i.e., approximately 0.6 V. Through the diode D1, the gate electrode G of the second transistor T2 is at a potential that corresponds to the value of the second supply voltage U2 less the value of the forward voltage for the first diode D1. This potential is, for an assumed second supply voltage U2 of approximately 10–15 V, much higher than the potential on the source electrode S, which means that the second transistor T2 is always on when the first transistor T1 is on. So long as the first transistor T1 is on, there is no flow of current through the second transistor T2 in this case. When the first transistor T1 turns off, the second transistor T2 remains on because the charge stored in its gate capacitor cannot flow away through the diode D1. The second transistor T2 then draws the primary current from the primary coil $L_P$ to charge the capacitor $C_{ST}$. To turn it off, the second transistor T2 is discharged through the second output terminal A2 of the control circuit ST, preferably, to reference ground potential on the terminal V2. To such an end, the control circuit preferably contains a current sink that can be connected between the second output terminal A2 and the second voltage supply terminal V2, or the terminal K2.

Figure 4:
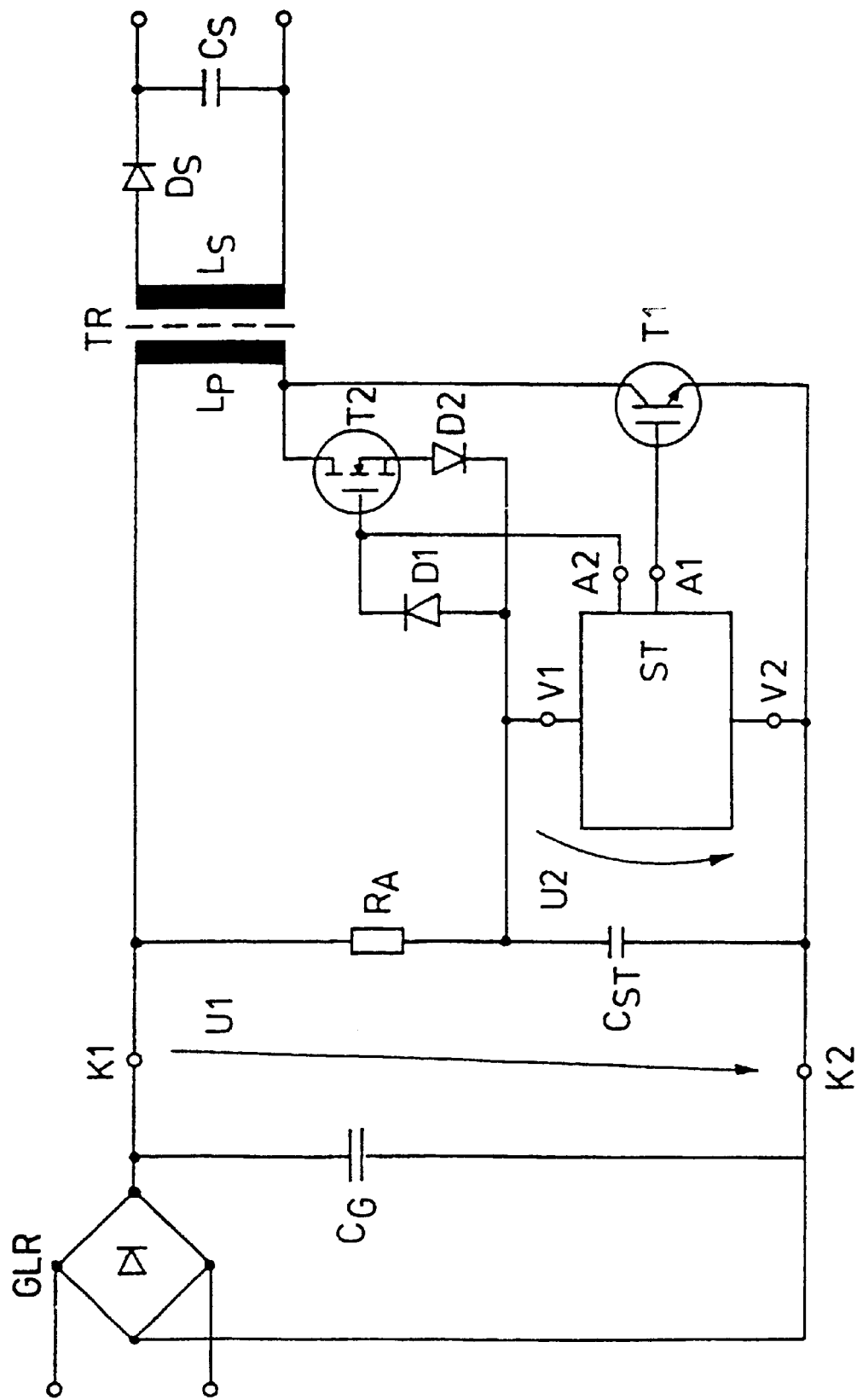
FIG. 4 is a block and schematic circuit diagram of a third embodiment of the circuit configuration of FIG. 1 having an IGBT as the first switch.

Another embodiment of the circuit configuration shown in FIG. 3 is shown in FIG. 4. In such a case, the first switch T1 is in the form of an IGBT that, as compared with the use of a MOSFET, has the advantage of a lower resistance in the on state, but has the drawback of a longer reaction time when turning off, i.e., the current in the IGBT decays slowly upon turning off. The present invention allows such a current to be able to decay slowly while the second transistor T2 takes on the primary current. The circuit can, therefore, also be used for high switching frequencies.

Figure 5:
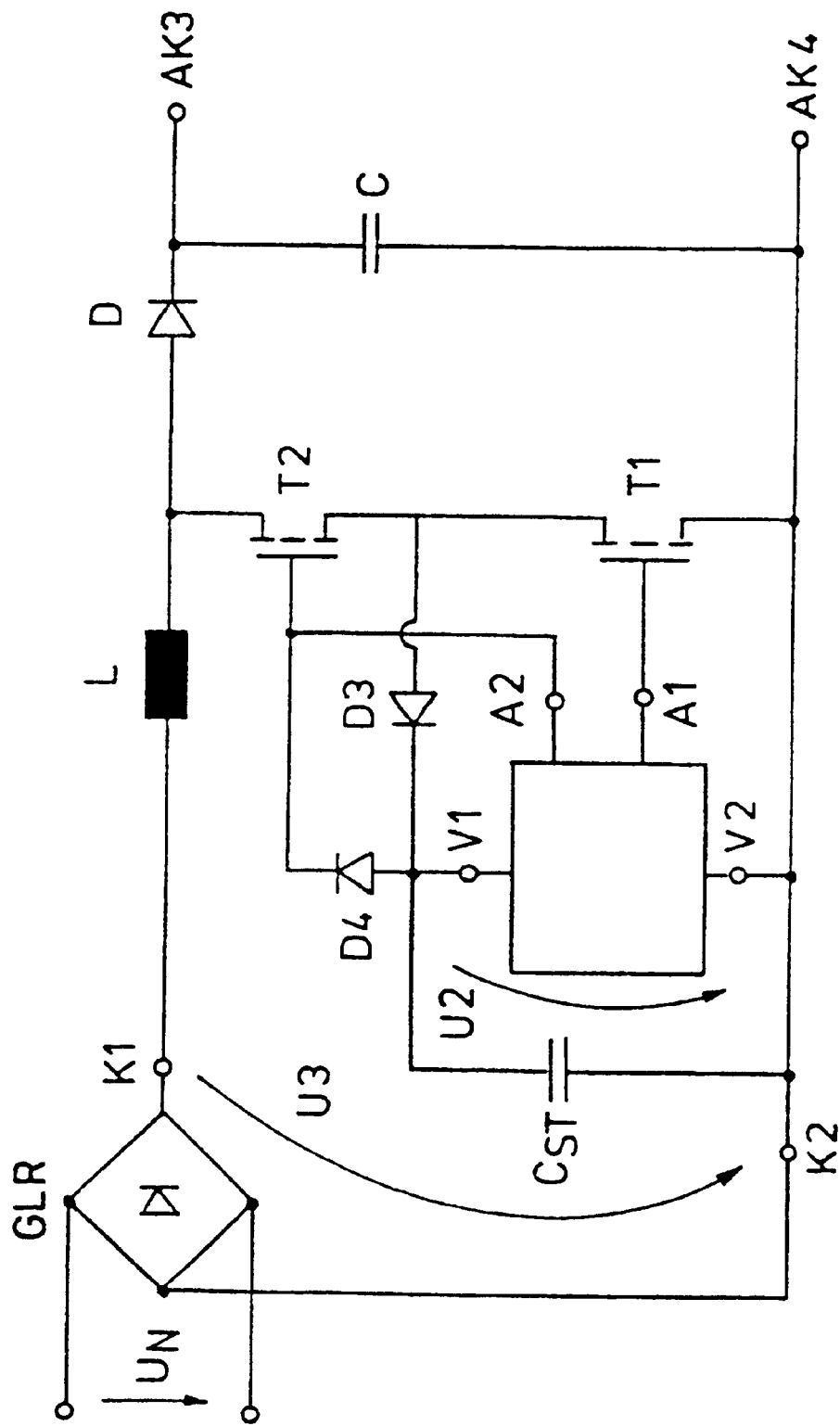
FIG. 5 is a block and schematic circuit diagram of a fourth embodiment of the circuit configuration of FIG. 1, in which the first and second switches are connected in series.

FIG. 5 shows another embodiment of an inventive circuit configuration used in a power factor controller, where it is used for the clocked application of an inductor L to a first supply voltage U3 that is present between a first and a second supply terminal K1, K2 and is produced from a power supply voltage UN by a bridge rectifier GLR. With the supply voltage U3 applied, the inductor draws energy that it then forwards to output terminals AK3, AK4 through a rectifier configuration D, C.

The first transistor T1, as first switch, is connected in series with the inductor L, and its gate electrode G is connected to the first output terminal A1 of the control circuit ST. The second transistor T2, as second switch, is connected between the inductor L and the first voltage supply terminal of the control circuit ST, with the second transistor T2 being connected in series with the inductor L and the first transistor T1, between the inductor L and the first transistor T1. In such a case, the first voltage supply terminal V1 is connected through a diode D3 to a node that is common to the first and to the second transistor T1, T2.

The gate connection of the second transistor T2 is connected to the second output terminal A2 of the control circuit ST and through a diode D4 to the first voltage supply terminal V1, or one terminal of the capacitor $C_{ST}$. When the first transistor T1 is on, the source electrode S of the second transistor T2 is approximately at the reference ground potential of the second terminal, and its gate electrode is above the value of the reference ground potential approximately by the value of the second supply voltage U2. The second transistor T2 is, thus, likewise on. The inductor L has then been connected to the supply voltage U3 and draws energy. When the first transistor T1 turns off, the second transistor T2 remains on because its gate capacitor cannot be discharged through the diode D4. The current flowing through the inductor then flows through the second transistor T2 and the diode D3 to the capacitor $C_{ST}$ to provide the second supply voltage U2.

A common feature of all the embodiments is that, when the first transistor T1 has turned off, the capacitor $C_{ST}$ is charged through the second switch by the current flowing through the load $L_P$, L. The energy stored in the capacitor is used to supply the control circuit ST until charge is drawn through the second switch again. The second transistor T2 remains on until a charge has flowed to the capacitor that corresponds to the charge that has flowed away since charge was last drawn.

I claim:

1. A circuit configuration for clocked application of a supply voltage to a load, the circuit configuration comprising:
   a first switch having a first control connection, said first switch connected in series with the load;
   a control circuit connected to said first switch, said control circuit having:
      a first output terminal connected to said first control connection for actuating said first switch; and
      first and second voltage supply terminals; and
   a second switch having a second control connection to which an actuation signal is supplied, said second switch and said control circuit forming a series circuit, said series circuit being connected in parallel with said first switch, said second switch connected between the load and said first voltage supply terminal.

2. The circuit configuration according to claim 1, wherein said control circuit has a second output terminal connected to said second control connection for actuating said second switch.

3. The circuit configuration according to claim 1, including a capacitor is connected between said first and second voltage supply terminals and in parallel with said control circuit.

4. The circuit configuration according to claim 1, wherein:
   said first switch has a connection terminal remote from the load; and
   said second voltage supply terminal and said connection terminal are connected to ground.

5. The circuit configuration according to claim 1, including a diode is connected between said first voltage supply terminal and said second switch.

6. The circuit configuration according to claim 1, wherein said second switch is connected in series with the load and said first switch.

7. The circuit configuration according to claim 6, wherein said second switch is connected between the load and said first switch.

8. The circuit configuration according to claim 7, wherein:
   said first switch and said second switch have a common node; and
   a diode is connected between said common node and said first voltage supply terminal of said control circuit.

9. The circuit configuration according to claim 6, wherein:
   said first switch and said second switch have a common node; and
   a diode is connected between said common node and said first voltage supply terminal of said control circuit.

10. The circuit configuration according to claim 1, including a diode connected between said first voltage supply terminal and said second control connection.

11. The circuit configuration according to claim 1, wherein
    the supply voltage is supplied at a terminal; and
    a resistor is connected between the terminal and said first voltage supply terminal.

12. The circuit configuration according to claim 1, including a resistor connected in parallel with said second switch between the load and said first voltage supply terminal.

13. The circuit configuration according to claim 1, wherein:
    said first switch has a connection terminal remote from the load; and
    said second voltage supply terminal and said connection terminal are connected to a common terminal at reference ground potential.

14. A switched-mode power supply for applying a supply voltage to a load, the power supply comprising:
    a first switch having a first control connection, said first switch being an IGBT connected in series with the load;
    a control circuit connected to said first switch, said control circuit having:
       a first output terminal connected to said first control connection for actuating said first switch; and
       first and second voltage supply terminals;
    a second switch having a second control connection to which an actuation signal is supplied, said second switch and said control circuit forming a series circuit, said series circuit being connected in parallel with said first switch, said second switch being a MOSFET connected between the load and said first voltage supply terminal; and
    said first and second switches being semiconductor switches selected from the group consisting of FETs and IGBTs.

15. The switched-mode power supply according to claim 14, wherein said second switch is one of a depletion-mode MOSFET and a JFET.

16. In a power factor controller applying a supply voltage to an inductor through which an input current flows, a circuit configuration comprising:

a first switch having a first control connection, said first switch connected in series with the inductor;

a control circuit connected to said first switch, said control circuit having:
  a first output terminal connected to said first control connection for actuating said first switch; and
  first and second voltage supply terminals; and a second switch having a second control connection to which an actuation signal is supplied, said second switch and said control circuit forming a series circuit, said series circuit being connected in parallel with said first switch, said second switch connected between the inductor and said first voltage supply terminal.

17. The circuit configuration according to claim 16, wherein said first and second switches are semiconductor switches selected from the group consisting of FETs and IGBTs.

18. A method for applying a supply voltage to a load, which comprises:

connecting a first switch in series with the load, the first switch having a first control connection;

connecting a control circuit to the first switch, the control circuit having:
  a first output terminal; and
  first and second voltage supply terminals;

connecting the first output terminal to the first control connection for actuating the first switch;

connecting a second switch between the load and the first voltage supply terminal, the second switch having a second control connection;

supplying an actuation signal to the second control connection; and actuating the first and second switches by:
  turning on the first and second switches at least approximately at the same time; and
  turning off the first and second switches at different times.

19. The method according to claim 18, wherein the first and second switches are semiconductor switches selected from the group consisting of FETs and IGBTs.

20. The method according to claim 18, wherein an on duration of the second switch is dependent upon a value of the supply voltage present across the first and second voltage supply terminals.

21. A method for applying a supply voltage to a load, which comprises:

connecting a first switch in series with the load, the first switch having a first control connection;

connecting a control circuit to the first switch, the control circuit having:
  a first output terminal; and
  first and second voltage supply terminals;

connecting the first output terminal to the first control connection for actuating the first switch;

connecting a second switch between the load and the first voltage supply terminal, the second switch having a second control connection;

supplying an actuation signal to the second control connection; and actuating the first and second switches by:
  turning on the second switch one of before and at approximately the same time as the first switch is turned off; and
  turning off the second switch after the first switch has been turned off.

22. The method according to claim 21, wherein the first and second switches are semiconductor switches selected from the group consisting of FETs and IGBTs.

23. The method according to claim 21, wherein an on duration of the second switch is dependent upon a value of the supply voltage present across the first and second voltage supply terminals.

24. In a switched-mode power supply applying a supply voltage to a primary coil of a transformer, a circuit configuration comprising:

a first switch having a first control connection, said first switch connected in series with the primary coil;

a control circuit connected to said first switch, said control circuit having:
  a first output terminal connected to said first control connection for actuating said first switch; and
  first and second voltage supply terminals; and a second switch having a second control connection to which an actuation signal is supplied, said second switch and said control circuit forming a series circuit, said series circuit being connected in parallel with said first switch, said second switch connected between the primary coil and said first voltage supply terminal.

25. The circuit configuration according to claim 24, wherein said first and second switches are semiconductor switches selected from the group consisting of FETs and IGBTs.

* * * * *